United States Patent [19]

Wenzel et al.

[11] 4,240,942
[45] Dec. 23, 1980

[54] PROCESS FOR THE PREPARATION OF AQUEOUS DISPERSIONS OR SOLUTIONS OF ISOCYANATE POLYADDITION PRODUCTS

[75] Inventors: Wolfgang Wenzel, Bergisch-Gladbach; Walter Meckel, Neuss; Josef Pedain, Cologne, all of Fed. Rep. of Germany

[73] Assignee: Bayer Aktiengesellschaft, Leverkusen, Fed. Rep. of Germany

[21] Appl. No.: 925,674

[22] Filed: Jul. 18, 1978

[30] Foreign Application Priority Data

Jul. 30, 1977 [DE] Fed. Rep. of Germany ....... 2734576

[51] Int. Cl.$^3$ ..................... C08J 3/08; C08L 75/04
[52] U.S. Cl. ............................ 260/29.2 TN; 525/453
[58] Field of Search ................. 260/29.2 TN; 525/453

[56] References Cited

U.S. PATENT DOCUMENTS

| | | |
|---|---|---|
| 3,756,992 | 9/1973 | Dieterich .................... 260/29.2 TN |
| 3,763,054 | 10/1973 | Reischl et al. . |
| 3,870,684 | 3/1975 | Witt et al. ..................... 260/29.2 N |
| 4,016,121 | 4/1977 | Matsuda et al. ............. 260/29.2 TN |
| 4,028,313 | 7/1977 | Müller et al. ................. 260/29.2 TN |
| 4,094,842 | 6/1978 | Wenzel et al. ............... 260/29.2 TN |
| 4,108,814 | 8/1978 | Reiff et al. ................... 260/29.2 TN |
| 4,123,423 | 10/1978 | Wenzel et al. ............... 260/29.2 TN |

*Primary Examiner*—Allan Lieberman
*Attorney, Agent, or Firm*—Gene Harsh; Lawrence S. Pope; Thomas W. Roy

[57] ABSTRACT

The present invention relates to a process for the preparation of aqueous dispersions or solutions of isocyanate polyaddition products characterized in that oligourethanes (a) which have an average molecular weight of less than about 15,000,
(b) which contain from about 0 to 120 milliequivalents, per 100 g of solid content, of built-in ionic groups and/or from about 0 to 25% by weight, based on the total weight of the oligourethane, of built-in ethylene oxide units —CH$_2$—CH$_2$—O— present within a polyether chain and/or from about 0 to 30% by weight, based on the total weight of the oligourethane, of external emulsifiers which are not chemically fixed, the total quantity of the aforesaid hydrophilic groups or external emulsifiers being sufficient to ensure the dispersibility or solubility of the oligourethanes in water, and
(c) which contain primary or secondary amino end groups or semicarbazide end groups with at least one NH end group are reacted in the aqueous phase with a chain lengthening agent which is at least difunctional and which undergoes an addition reaction or condensation reaction with the amino end groups or semicarbazide end groups to effect chain lengthening of the oligourethanes. The present invention also relates to the dispersions or solutions obtainable by this process and to their use for the production of films and coatings.

14 Claims, No Drawings

PROCESS FOR THE PREPARATION OF AQUEOUS DISPERSIONS OR SOLUTIONS OF ISOCYANATE POLYADDITION PRODUCTS

FIELD OF THE INVENTION

This invention relates to a process for the preparation of aqueous dispersions or solutions of isocyanate polyaddition products, to the dispersion or solutions obtainable by this process and to their use for the production of films and coatings.

BACKGROUND OF THE INVENTION

Processes for the preparation of stable, aqueous polyurethane-polyurea dispersions are already known and are described, for example, in German Patent Specifications No. 1,184,946 and 1,178,586; German Auslegeschrift No. 1,237,306; German Offenlegungsschriften Nos. 1,495,745; 1,595,602; 1,770,068; 2,019,324 and 2,314,512 and U.S. Pat. Nos. 3,388,087; 3,461,103; 3,479,310; 3,756,992 and 3,686,108 and by D. Dieterich et al, in Angew. Chem. 82, 53 (1970). The dispersions described are based on the principle of incorporating hydrophilic centers into a macromolecular chain of a polyurethane (polyurea) molecule. In the known dispersions, these hydrophilic centers or so called internal emulsifiers are polyether segments containing ethylene oxide groups or ionic groups. The hydrophilic centers may either be built into the prepolymer in the form of special diols or contributed by modified amines used for chain-lengthening the prepolymers which have each at least two isocyanate end functions.

Various processes may be used for preparing the known dispersions and have been described, for example, in D. Dieterich and H. Reiff, Angew, makromol. Chemie 26, 85 (1972). Generally, the solution of a polyurethane in an organic solvent either is converted into an aqueous dispersion or a prepolymer stage in the liquid form, with or without solvent, is dispersed in water. For example, a liquid prepolymer ionomer containing isocyanate groups may be introduced into water with vigorous stirring, in which case an emulsion of the prepolymer is first formed, and this then continues to react by a process of chain lengthening, for example with a diamine or polyamine dissolved in water, to form a high molecular weight polyurethane urea. Since the isocyanate prepolymer is hydrophilic and, therefore, highly compatible with water, this reaction is invariably accompanied to a greater or lesser extent by an unwanted reaction of isocyanate groups with water, which leads to an uncontrolled increase in the size of the molecule. This side reaction increases with increasing dispersion temperature and may even cause gelling of the reaction mixture.

The present invention provides a new process for the preparation of aqueous dispersions or solutions of isocyanate polyaddition products, by which such side reactions are virtually eliminated. According to the invention, urethane prepolymers which contain amino or semicarbazide end groups and which are hydrophilic, i.e. soluble or dispersible in water, are chain lengthened in an aqueous phase with a hydrophobic chain lengthening agent, preferably a hydrophobic diisocyanate. Owing to the hydrophobic character of the chain lengthening agent, virtually no side reaction takes place with the water which constitutes the continuous phase.

SUMMARY OF THE INVENTION

The present invention, thus, relates to a process for the preparation of aqueous dispersions or solutions of isocyanate polyaddition products, characterized in that oligourethanes
  (a) which have an average molecular weight of less than about 15,000,
  (b) which contain from about 0 to 120 milliequivalents, per 100 g of solid content, of built-in ionic groups and/or from about 0 to 25% by weight, based on the total weight of the oligourethane, of built-in ethylene oxide units $-CH_2-CH_2-O-$ present within a polyether chain and/or from about 0 to 30% by weight, based on the total weight of the oligourethane of external emulsifiers which are not chemically fixed, the total quantity of the aforesaid hydrophilic groups or external emulsifiers being sufficient to ensure the dispersibility or solubility of the oligourethanes in water, and
  (c) which contain primary or secondary aminic amino end groups or semicarbazide end groups with at least one NH end group
are reacted in the aqueous phase with a chain lengthening agent which is at least difunctional and which undergoes an addition reaction or condensation reaction with the amino end groups or semicarbazide end groups to effect chain lengthening of the oligourethanes.

The present invention also relates to the dispersions or solutions obtainable by this process and to their use for the production of films and coatings.

DETAILED DESCRIPTION OF THE INVENTION

The oligourethanes to be used in the process according to the invention are characterized by
  (a) having an average molecular weight of less than about 15,000, preferably from about 1,000 to 10,000,
  (b) containing a total quantity of hydrophilic groups and/or emulsifiers sufficient to ensure their dispersibility or solubility in water, i.e. from about 0 to 120 milliequivalents, preferably from about 0,5 to 50 milliequivalents, per 100 g of solids content, of built-in cationic or anionic groups and/or from about 0 to 25% by weight, preferably from about 3 to 18% by weight, based on the total weight of the oligourethane, of ethylene oxide units $-CH_2-CH_2-O-$ present within a polyether segment either in side chains or in end positions and/or within the main chain, and/or from about 0 to 30% by weight, preferably from about 5 to 20% by weight, based on the total weight of the oligourethane, of external emulsifiers which are not chemically fixed, and
  (c) containing primary or secondary aminic amino end groups or semicarbazide end groups which have at least one NH group which means at least one hydrogen atom bound to nitrogen in the end position such as is obtained by the reaction of isocyanate groups with hydrazines which contain at least two NH groups.

"Aminic" amino groups shall mean tht the amino groups are directly linked to carbon atoms the remaining three valences of which are saturated by links to carbon and/or hydrogen atoms in contrast to i.e. "acylated amino groups $-CO-NH_2$."

One essential feature of these oligourethanes is their molecular weight, which should preferably be between about 1,000 and 10,000. Prepolymers having average molecular weights of between about 10,000 and 15,000 are in principle also dispersible although with considerable difficulty. The molecular weight of the oligourethane can easily be adjusted in known manner by suitable choice of the nature and quantitative proportions of the starting materials. Thus, for example, the formation of high molecular weight polyurethanes in the isocyanate polyaddition reaction is prevented by using an isocyanate excess for the preparation of the isocyanate prepolymers.

The average molecular weight can be calculated from the stoichiometric relationships of the reaction, as indicated below.

If, for example, 2 mols of a dihydroxy compound having a molecular weight of 2,000 are reacted with 1 mol of a basic chain lengthening agent having a molecular weight of 119, 4.75 mols of a diisocyanate having a molecular weight of 168 and 3.5 mols of hydrazine having a molecular weight of 32 to form an oligourethane with 2 semicarbazide end groups, the molecular weight is calculated as follows:

$$\text{Molecular weight} = \frac{2}{3.5} (2 \times 2000 + 119 + 4.75 \times 168 + 3.5 \times 32) \approx 2874$$

The above mentioned hydrophilic groups are preferably fixed in the oligourethane in order to ensure the dispersibility or solubility of the oligourethane. The use of external emulsifiers is less advantageous.

The oligourethanes used for the process according to the invention are prepared via the intermediate stage of the corresponding prepolymers which contain isocyanate end groups and which otherwise conform in their molecular weight and their hydrophilic group content to the conditions indicated above since conversion of the isocyanate end groups into semicarbazide or amino end groups is not accompanied by any significant increase in the molecular weight. This means that where oligourethanes having ionic groups or non-ionic hydrophilic groups of the kind mentioned above are used, these groups are already present in the isocyanate prepolymers used as intermediate products for the preparation of the starting materials according to the invention. The only exception is that where ionically modified oligourethanes are to be used in the process according to the invention, one could conceivably first prepare an isocyanate prepolymer which contains potential ionic groups, i.e. in particular carboxylic or sulphonic acid groups. These potential ionic groups would be converted into ionic groups, in particular by neutralization, only after conversion of the isocyanate prepolymers into oligourethanes which contain amino end groups or semicarbazide end groups.

The oligourethanes used for the process according to the invention preferably have a statistical average of from about 1.8 to 2.2, preferably two amino end groups or semicarbazide end groups.

From what has been said above, it will be clear that the isocyanate prepolymers used for preparing the oligourethanes which are to be used according to the invention are preferably difunctional.

Moreover, they preferably have one or more hydrophilic groups which render them soluble or dispersible in water. According to what has been said above, it is also possible to use hydrophobic isocyanate prepolymers, provided that they are rendered soluble or dispersible in water by the addition of external emulsifiers before or after they are converted into oligourethanes containing amino end groups or semicarbazide end groups. The hydrophilic character of isocyanate prepolymers containing chemically fixed hydrophilic groups or of the oligourethanes prepared from them could, of course, also be increased by the addition of external emulsifiers.

Provided that the isocyanate prepolymers conform to the conditions indicated above in their chemical nature, their exact chemical structure is not critical. This means in particular that any isocyanate prepolymers which have hitherto been used for the preparation of aqueous polyurethane dispersions or solutions are suitable in principle. These may be prepared by methods known in the art, which have been described, for example, in German Offenlegungsschriften Nos. 1,495,745; 1,495,847; 2,446,440 and 2,340,512; U.S. Pat. Nos. 3,479,310 and 3,756,992 and allowed U.S. patent application Ser. No. 777,206, filed Mar. 14, 1977 now U.S. Pat. No. 4,108,814, all incorporated herein by reference, and British Pat. Nos. 1,158,088 and 1,076,688.

Preparation of the preferred isocyanate prepolymers which have chemically fixed hydrophilic groups is carried out by methods similar to those mentioned in the literature references given above as examples. The following starting materials are, therefore, used for the preparation of these isocyanate prepolymers.

1. Any organic polyisocyanates, preferably diisocyanates of the following formula:

$$Q(NCO)_2$$

in which Q represents an aliphatic hydrocarbon group having from 4 to 12 carbon atoms, a cycloaliphatic hydrocarbon group having from 6 to 15 carbon atoms, an aromatic hydrocarbon group having from 6 to 15 carbon atoms or an araliphatic hydrocarbon group having from 7 to 15 carbon atoms. Examples of these preferred diisocyanates include tetramethylene diisocyanates; hexamethylene diisocyanate; dodecamethylene diisocyanate; 1,4-diisocyanate-cyclohexane; 1-isocyanato-3,3,5-trimethyl-isocyanatomethylcyclohexane; isophorone diisocyanate; 4,4'-diisocyanato-dicyclohexyl methane; 4,4'-diisocyanatodicyclohexyl propane-(2,2); 1,4-diisocyanatobenzene; 2,4-diisocyanatotoluene; 2,6-diisocyanatotoluene; 4,4'diisocyanato-diphenyl methane; 4,4'-diisocyanatodiphenyl propane-(2,2); p-xylylene-diisocyanate; $\alpha,\alpha,\alpha',\alpha'$-tetramethyl-m- or -p-xylylene-diisocyanate, and mixtures of these compounds.

The higher functional polyisocyanates known in polyurethane chemistry and the known modified polyisocyanates, e.g. polyisocyanates containing carbodiimide groups, allophanate groups, isocyanurate groups, urethane groups and/or biuret groups, may, of course, also be used as all or part of the isocyanate component.

2. Any organic compounds having at least two isocyanate-reactive groups, in particular organic compounds with molecular weights of from about 60 to 10.000, preferably about 62 to 10.000, more preferably about 1000 to 6000 and most preferably about 500 to 4000, for example, having at least two amino groups, thiol groups, carboxyl groups and/or hydroxyl groups. The appropriate dihydroxy compounds are preferably used. A small proportion of compounds which are tri-functional or higher functional in the isocyanate polyaddition reaction may be added in order to produce a certain degree of branching, and the tri-functional and higher functional polyisocyanates already mentioned above may also be used for the same purpose.

The preferred hydroxyl compounds are the hydroxy polyesters, hydroxy polyethers, hydroxy polythioethers, hydroxy polyacetals, hydroxy polycarbonates and/or hydroxy polyesteramides already known per se in polyurethane chemistry.

Suitable polyesters with hydroxyl groups include, for example, the reaction products of polyhydric, preferably dihydric alcohols to which trihydric alcohols may be added and polybasic, preferably di-basic carboxylic acids. Instead of using free carboxylic acids, the corresponding polycarboxylic acid anhydrides or corresponding polycarboxylic acid esters of lower alcohols or mixtures thereof may be used for preparing the polyesters.

The polycarboxylic acids may be aliphatic, cycloaliphatic, aromatic and/or heterocyclic and they may be substituted, e.g. by halogen atoms, and/or unsaturated. The following are mentioned as examples: Succinic acid; adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters.

The following are examples of suitable polyhydric alcohols: Ethylene glycol, propylene glycol-(1,2) and -(1,3), butylene glycol-(1,4) and -(2,3), hexanediol-(1,6), octanediol-(1,8), neopentylglycol, cyclohexanedimethanol, (1,4-bishydroxy-methylcyclohexane), 2-methyl-1,3-propanediol, glycerol, trimethylolpropane, hexanetriol-(1,2,6), butanetriol-(1,2,4), trimethylol ethane, pentaerythritol, quinitol, mannitol, and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups.

Polyesters of lactones such as ε-caprolactone or hydroxycarboxylic acids such as ω-hydroxycaproic acid may also be used.

The polyethers used according to the invention which have preferably two hydroxyl groups are also known per se and are prepared, for example, by polymerization of epoxides such as ethylene oxide, propylene oxide, butylene oxide, tetrahydrofuran, styrene oxide or epichlorohydrin, either each on its own, e.g. in the presence of boron trifluoride, or by addition of these epoxides, either as mixtures or successively, to starting components having reactive hydrogen atoms, such as alcohols or amines, e.g. water, ethylene glycol, propylene glycol-(1,3) or -(1,2), 4,4'-dihydroxy-diphenylpropane or aniline.

Polyethers modified with vinyl polymers, e.g. the compounds obtained by polymerization of styrene or acrylonitrile in the presence of polyethers as described in U.S. Pat. Spec. Nos. 3,383,351; 3,304,273; 3,523,093 and 3,110,695 and German Patent Specification No. 1,152,536, are also suitable. The higher functional polyethers which may also be used to a limited extent are prepared in similar manner from the known alkoxylation of higher functional starter molecules e.g. ammonia, ethanolamine, ethylene diamine or sucrose.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the components.

Suitable polyacetals include, for example, the compounds which can be prepared from glycols such as diethylene glycol, triethylene glycol, 4,4'- diethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example, those which can be prepared by the reaction of diols such as propanediol-(1,3), butanediol-(1,4) and/or hexanediol-(1,6), diethylene glycol, triethylene glycol or tetraethylene glycol with phosgene or diaryl-carbonates, e.g. with diphenylcarbonate.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof. Polyhydroxyl compounds already containing urethane or urea groups may also be used.

Low molecular weight polyols may also be used as all or part of the polyhydroxyl component. The following are examples: ethanediol, propanediol-(1,2) and -(1,3), butanediol-(1,4) and -(1,3), pentanediols, hexanediols, trimethylolpropane, hexanetriols, glycerol and pentaerythritol. Diamines such as hexamethylenediamine or 1-amino-3,3,5-trimethyl-5-aminocyclohexane may also be used.

Representatives of the polyisocyanate and hydroxyl compounds which may be used in the process according to the invention have been described, for example, in High Polymers, Vol. XVI "Polyurethanes, Chemistry and Technology" by Saunders and Frisch, Interscience Publishers, New York, London, Volume I, 1962, pages 32 to 42 and 44 to 54 and Volume II, 1964, pages 5 to 6 and 198 to 199 as well as in Kunststoff-Handbuch, Volume VII, Vieweg-Höchtlen, Carl-Hanser-Verlag, Munich, 1966, e.g. on pages 45 to 71.

If oligourethanes containing chemically fixed ionic or non-ionic hydrophilic groups are to be used in the process according to the invention, they are prepared from the correspondingly modified isocyanate prepolymers. These hydrophilically modified prepolymers are prepared by methods known in the art, for example those described in German Offenlegungsschriften Nos. 1,495,745; 1,495,847; 2,446,440; and 2,340,512; U.S. Pat. Nos. 3,479,310 and 3,756,992 and allowed U.S. patent application Ser. No. 777,206, filed Mar. 14, 1977, all incorporated herein by reference; and British Pat. Nos. 1,158,088 and 1,076,688. This means that when preparing the prepolymers, starting components which contain chemically fixed hydrophilic groups and which are preferably monofunctional or, more preferably, difunctional in the isocyanate addition reaction, such as compounds of the kind already described in the above mentioned literature references for the preparation of aqueous polyurethane dispersions or solutions, i.e. for example, diisocyanates, diamines or dihydroxy compounds containing ionic or potential ionic groups or diisocyanates or glycols containing polyethylene oxide units, are used in addition to the starting materials already mentioned above as examples.

The hydrophilically modified starting components include, in particular, aliphatic diols which contain sulphonate groups according to German Offenlegungsschrift No. 2,446,440 which corresponds to allowed U.S. Pat. application Ser. No. 777,206, filed Mar. 14, 1977, incorporated herein by reference, internal emulsifiers which can be cationically or anionically fixed according to German Patent application P 26 51 506.0 which corresponds to U.S. patent application Ser. No. 849,690 filed Nov. 8, 1977, now abandoned and the monofunctional polyethers also described in German Patent Application 26 51 506.0, which can be chemically fixed.

The preferred (potential) ionic starting components include, in particular, N-alkyl-dialkanolamines such as N-methyl-diethanolamine, N-ethyl-diethanolamine or N-propyldipropanolamine; diaminosulphonates of the kind described in Canadian Pat. No. 928,323, e.g. the sodium salt of N-(2-aminoethyl)-2-aminoethane sulphonic acid; dimethylolpropionic acid and sulphonate diols represented by the following general formula:

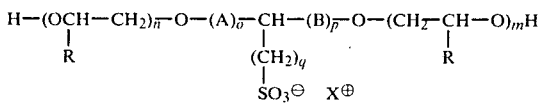

in which
A and B, which may be the same or different, represent divalent aliphatic hydrocarbon groups having from 1 to 6 carbon atoms,
R represents hydrogen, an aliphatic hydrocarbon group with from 1 to 4 carbon atoms or a phenyl group,
$X^\oplus$ represents an alkali metal cation or a substituted or unsubstituted ammonium group,
n and m, which may be the same or different, represent numbers of from 0 to 30,
o and p each represents 0 or 1 and
q represents an integer of from 0 to 2.

Any potential ionic groups present in the polyaddition product are converted into ionic groups by known methods. Thus, potential anionic and cationic groups are converted into the corresponding ionic groups by neutralization. Tertiary amino nitrogen atoms are converted into the corresponding ionic groups by quaternization as also are tertiary phosphinic phosphorus atoms which may be present in the polyaddition products according to the invention if, instead of the tertiary amines with isocyanate reactive hydrogen atoms mentioned above as examples, the corresponding tertiary phosphines were built into the molecule. Any thioether groups present are converted into the corresponding sulphonium salts by means of quaternizing agents. Suitable neutralizing and quaternizing agents have been described in U.S. Pat. No. 3,479,310, column 6, incorporated herein by reference. Conversion of the potential ionic groups into ionic groups may be carried out either before or after conversion of the isocyanate prepolymers into the starting materials according to the invention. This conversion at the later stage is particularly feasible in the case of carboxylic or sulphonic acid groups, which may be converted into ionic groups by neutralization after conversion of the isocyanate prepolymers into the oligourethanes which are to be used as starting materials according to the invention.

When isocyanate prepolymers are prepared according to principles known in the art, the reactants are generally used in quantitative proportions corresponding to a ratio of isocyanate groups to isocyanate-reactive hydrogen atoms, preferably in the form of hydroxyl groups, of from about 1.05 to 10, preferably from about 1.1 to 2.5.

The sequence in which the individual reactants are put into the process is to a large extent immaterial. The hydroxyl compounds may first be mixed and the polyisocyanate subsequently added or the mixture of hydroxyl compounds or the individual hydroxyl compounds in succession may be added to the polyisocyanate component.

The preparation of the isocyanate prepolymers is preferably carried out solvent free at about 30° to 190° C., preferably at about 50° to 120° C., although it may, of course, also be carried out in the presence of organic solvents.

Suitable solvents would be, for example, acetone, methylethylketone, ethyl acetate, dimethylformamide and cyclohexanone, and these may be used in a quantity of up to about 25% by weight, based on the solids content.

For preparing the oligourethanes which are to be used as starting materials in the process according to the invention, the isocyanate prepolymers mentioned as examples are preferably modified by one of the following two methods:

According to a first method, the isocyanate prepolymers are reacted with hydrazines of the kind mentioned below as examples or with diamines in which the amino groups differ greatly from each other in their reactivity towards isocyanate groups.

Suitable hydrazines include any hydrazines which contain two NH groups, i.e. both hydrazine or hydrazines. Suitable substituents for the hydrazines are in particular alkyl groups containing 1 to 4 carbon atoms. Suitable hydrazines therefore include hydrazine, hydrazine hydrate, N-methylhydrazine, N,N'-dimethylhydrazine, N-butyl-hydrazine and N,N'-dibutyl-hydrazine.

Suitable diamines containing amino groups differing in their reactivity include any diamines containing primary and/or secondary amino groups which conform to these conditions. This difference in the reactivity of the amino groups in the diamines may be brought about by steric and/or mesomeric effects and/or by differences in the types of bonds of the amino groups. Suitable diamines of the first mentioned type include 2,4-diaminotoluene, 1-methyl-2,4-diamino-cyclohexane and 2,4'-diamino-diphenylmethane. The following are examples of diamines in which the differences between the reactivities of the two amino groups are due to differences in the types of bonds of the amino groups although steric effects may play an additional role: 2-(2-aminoethyl)-aniline, 2-(3-aminopropyl)-aniline, N-(3-aminopropyl)-aniline, N-(6-aminohexyl)-aniline, 2-(2-aminoethyl)-naphthalene, N-(2-aminoethyl)-aniline, 2-(2-aminoethylamino)-naphthalene, 2-aminophenyl-(3-aminopropyl)-thioether and 2-aminomethyl-aniline.

Simple aromatic diamines such as 1,4-diaminobenzene are also suitable because, due to the effects of mesomerism, the second amino groups is less reactive towards isocyanate groups after the first amino group has reacted. Diamines whose pKb values for the two amino groups in an aqueous medium at about 25° C. differ from each other by a factor of at least about $10^3$, preferably $10^6$, are generally suitable.

The diamines or hydrazines generally have a molecular weight of from about 32 to 400.

The reaction of the isocyanate prepolymers with the hydrazines or diamines is generally carried out solvent-free or in the presence of inert solvents of the kind mentioned above as examples and at temperatures of from about 10° to 120° C. The reactants are preferably put into the process in quantities providing from about 0.8 to 1.2 mol, preferably about 1 mol of the hydrazine or diamine to 1 mol of the isocyanate groups of the isocyanate prepolymer.

The inert solvents used are preferably solvents which contain keto groups, e.g. acetone, methylethylketone, methylisobutylketone or cyclohexanone.

According to another method of converting the isocyanate prepolymers into starting materials suitable for the process according to the invention the isocyanate prepolymers are reacted with compounds which contain an isocyanate reactive group, preferably a hydroxyl group, and in addition a masked amino group which is inert towards isocyanate groups and forms a free amino group under the influence of water. Suitable compounds of this kind are in particular those of the following formula:

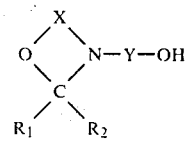

in which

R$_1$ and R$_2$, which may be the same or different, represent hydrogen, aliphatic hydrocarbon groups having from 1 to 4 carbon atoms, cycloaliphatic hydrocarbon groups having from 5 to 7 carbon atoms or aromatic hydrocarbon groups having from 6 to 10 carbon atoms or R$_1$ and R$_2$ together with the ring-carbon atom may form a five-membered or six-membered cycloaliphatic hydrocarbon ring;

X represents a group of the formula:

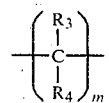

in which

R$_3$ and R$_4$, which may be the same or different, may represent hydrogen or C$_1$-C$_4$ alkyl groups, but preferably represent hydrogen, and
m represents 2 or 3;

Y represents a group of the formula:

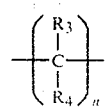

in which

R$_3$ and R$_4$ have the meanings indicated above and n represents an integer of from 2 to 6.

N-hydroxyalkyl-oxazolidines are prepared by methods known in the literature, in which a ketone or an aldehyde is condensed with a bis-(hydroxyalkyl)-amine by a process of dehydration accompanied by ring closure and the water of reaction is removed azeotropically in the usual manner by means of an inert carrier or by the carbonyl compound used in excess.

Suitable carbonyl compounds

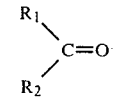

are in particular the following aldehydes and ketones: formaldehyde, acetaldehyde, propionaldehyde, butyraldehyde, isobutyraldehyde, benzaldehyde, tetrahydrobenzaldehyde, acetone, methylethylketone, methylpropylketone, methylisopropylketone, diethylketone, methylbutylketone, methylisobutylketone, methyl-t-butylketone, diisobutylketone, cyclopentanone and cyclohexanone. According to the definition given above for the preferred groups R$_2$ and R$_3$, the preferred carbonyl compounds are formaldehyde and the above mentioned aldehydes and ketones.

Particularly suitable bis-(hydroxyalkyl)-amines of the formula:

HO—X—NH—Y—OH are bis-(2-hydroxyethyl)-amine and bis-(2-hydroxypropyl)-amine, but equally suitable in principle are, for example, bis-(2-hydroxybutyl)-amine, bis-(2-hydroxyhexyl)-amine, bis-(3-hydroxyhexyl)-amine, and N-(2-hydroxypropyl)-N-(6-hydroxyhexyl)-amine.

When this method is employed for converting the isocyanate prepolymers into the starting materials to be used according to the invention, the hydroxyalkyl oxazolidines are reacted with the isocyanate prepolymers at about 20° to 120° C. with or without solvents, using the reactants in such proportions that the reaction mixture contains from about 0.8 to 1.2 mol, preferably about 1 mol of the oxazolidine derivative for each mol of isocyanate groups of the isocyanate prepolymer.

Another possible but less preferred method of converting the isocyanate prepolymers into starting materials suitable for the process according to the invention consists of reacting the isocyanate prepolymers with a large excess of any organic diamine, for example ethylene diamine or hexamethylene diamine, and then removing the unreacted excess, for example, by distillation under vacuum. Using a large excess ensures as much as in the first two methods mentioned above that no significant increase in the size of the molecule due to chain lengthening takes place. The use of continuously operating, high speed machines would be advantageous in this case.

To carry out the process according to the invention, the isocyanate prepolymer which has been modified as described above and contains semicarbazide groups, amino groups or oxazolidine groups as end groups is dispersed or dissolved in water. If these compounds contain oxazolidine groups, hydrolysis takes place instantly with liberation of the corresponding amino groups from the oxazolidine group. The quantity of water used for this process of dispersion or solution is generally calculated so that the proportion by weight of prepolymer to water is between about 65:35 and 5:95, preferably between about 55:45 and 20:80.

The temperature employed for the dispersion process should be so far above the softening point of the prepolymer that the solvent free melt can easily be stirred. For purely nonionic dispersions or solutions, the temperature should not be substantially above about 60° C.

The process of dispersion may be assisted by the addition of external emulsifiers. These may be added either to the isocyanate prepolymers or to the resulting products which are to be used as starting materials according to the invention. They are used, if at all, in quantities generally amounting from about 1 to 30% by weight, preferably about 5 to 20% by weight, based on the isocyanate prepolymer or the oligourethane. Suitable emulsifiers of this kind have been described, for example, by R. Heusch in "Emulsionen," Ullmann, Volume 10, pages 449–473, Weinheim 1975. Both ionic emulsifiers such as alkali metal and ammonium salts of long chain fatty acids or long chain aryl (alkyl) sulphonic acids and non-ionic emulsifiers such as ethoxylated alkylphenols with an average molecular weight of from about 400 to 10,000 are suitable.

The process according to the invention itself consists of the chain lengthening of the oligourethanes in aqueous solution or dispersion, using suitable chain lengthening agents.

Suitable chain lengthening agents are any, preferably difunctional, organic compounds which react substantially selectively with the amino or semi-carbazide groups of the oligourethane in the presence of water to undergo an addition reaction or a condensation reaction. Suitable chain lengthening agents therefore include hydrophobic bis-epoxides such as the reaction product of bisphenol A with 2 mol of epichlorohydrin or higher molecular weight bis-epoxides with molecular weights of up to about 3,000 and in particular hydrophobic diisocyanates of the formula $Q(NCO)_2$ of the kind already mentioned above as examples.

The following chain lengthening agents are particularly preferred: hexamethylene diisocyanate, 1-isocyanato-3,3,5-trimethyl-5-isocyanatomethyl-cyclohexane, 2,4-diisocyanatotoluene, 2,6-diisocyanatotoluene, 4,4'-diisocyanato-diphenylmethane and any mixtures of these diisocyanates. Isocyanate prepolymers which have a molecular weight not exceeding about 3,000 and are preferably difunctional, such as those which can be obtained in known manner by reacting the low molecular weight diisocyanates already given as examples with suitable dihydroxy compounds are also suitable as chain lengthening agents according to the invention.

In the chain lengthening reaction according to the invention, the chain lengthening agents are generally used in the quantities required to provide from about 0.4 to 1.0 mol, preferably about 0.5 mol of the difunctional chain lengthening agent for each mol of amino groups or semicarbazide groups. The chain lengthening reaction according to the invention is generally carried out by stirring the chain lengthening agent, optionally dissolved in an inert solvent, into the previously prepared dispersion or solution. It is preferred to use liquid chain lengthening agents without solvents. The chain lengthening reaction according to the invention is generally carried out at temperatures within the range of from about 0° to 100° C., preferably from about 10° to 70° C.

One could in principle also use masked diisocyanates or polyisocyanates which may develop their chain-lengthening or cross-linking action by splitting off the masking agent only after application of the dispersions when they are subsequently heated.

The dispersions or solutions obtainable according to the invention are suitable for the known fields of application of aqueous polyurethane dispersions. For example, they may be used for dressing leather or finishing wool or they may be used for coating various materials such as textiles, plastics, glass, metals, paper or wood and they may be used, among other things, as lacquers or as adhesives. Other possible uses lie, for example, in the fields of glass fiber sizes or dispersing agents. These products may also be regarded as additives for synthetic resin dispersions and as binders, e.g. for cork or wood powder, glass fibers, asbestos, paper-type materials, plastics or rubber waste and ceramic materials.

The dispersions or solutions according to the invention may be mixed with any additives before their application, in particular with cross-linking agents such as formaldehyde, compounds which split off formaldehyde, or melamine resins; polymer latices obtained from various sources, e.g. those based on polyacrylonitrile, or butadiene-acrylonitrile copolymers or on grafted copolymers of acrylonitrile, butadiene and styrene, and those based on poly(meth)acrylates. The dispersions and solutions according to the invention may also be after treated by the process according to German Patent Application P 27 08 442 which corresponds to U.S. patent application Ser. No. 875,958 filed Feb. 8, 1978, now U.S. Pat. No. 4,186,118.

EXAMPLES

EXAMPLE 1

Reaction mixture 744.0 g of a polyester of adipic acid, phthalic acid and ethylene glycol (hydroxyl number 66) (PE)

142.8 g of a propoxylated adduct of 2-butenediol-(1,4) and sodium bisulphite (m.wt 457, 80% in toluene) (AD)

173.0 g of hexamethylene-1,6-diisocyanate (H)

34.2 g of hydrazine hydrate 2450 g of deionized water 76 g of isophorone diisocyanate (IPDI)

Method

The polyester (PE) and adduct (AD) are dehydrated by stirring for 45 minutes in a water jet vacuum at 110° C., cooled to 80° C. and reacted with the diisocyanate (H) at 80° C. An isocyanate value of 2.75% is obtained after about 40 minutes. The melt is cooled to 45° to 50° C. and stirred up with hydrazine hydrate until no more isocyanate is detected. The melt is dispersed in water at 50° C. with rapid stirring.

A finely divided dispersion having a Ford cup viscosity (4 mm nozzle) of 21 seconds at a solids content of 29.8% is obtained. The average molecular weight of the oligourethane is 3080. The solid content contains 1.9% of $SO_3^{\ominus}$ groups. IPDI is stirred at room temperature into the dispersion which contains semicarbazide end groups. No more isocyanate is found after 5 to 10 minutes stirring. A finely divided dispersion with a pH of 6.3 is obtained. On heating, it dries to form non-tacky films.

The tensile strength of the film is 14.7 MPa and the elongation at break is 340%.

EXAMPLE 2

Reaction mixture 350.0 g of a polyester of phthalic acid, adipic acid and ethylene glycol (hydroxyl number 64.1) (PE)
87.4 g of a propoxylated adduct of butene-1,4-diol and sodium bisulphite (m.wt 427.66% in toluene) (AD)
12.0 g of butane-1,4-diol
134.8 g of hexamethylene-1,6-diisocyanate (H)
11.4 g of isophorone diamine (IPDA) in
40.0 g of acetone
62.6 g of β-hydroxyethyl-oxazolidine
1450.0 g of deionized water

Method

The polyester (PE) and adduct (AD) are dehydrated in a water jet vacuum at 110° C. with stirring. The reaction mixture is then cooled to 80° C. and butane diol is stirred in. After 10 minutes stirring, the diisocyanate (H) is added and stirred in at 80° C. until an isocyanate content of 5% is reached (approximately 30 minutes). The IPDA in acetone is then added and the mixture is stirred for 30 minutes at 80° C. The isocyanate content found is 3.0%. The melt is then stirred up with oxazolidine at 80° C. until no more isocyanate is found (approximately 1 hour). The small quantity of acetone left is drawn off under vacuum. The product is then dispersed in water with vigorous stirring at 80° C.

The extremely finely divided dispersion obtained has a Ford cup viscosity (4 mm nozzle) of 18 seconds at a solid content of 28.75%. The average molecular weight of the oligourethane is 2350. The solid substance contains 21.5 milliequivalents of $SO_3^\ominus$ groups per 100 g (1.72%).

16.3 g of isophorone diisocyanate are added to 600 g of the dispersion at room temperature and the mixture is stirred at this temperature for 1 hour. No more isocyanate groups are then found. The dispersion is finely divided and shows a Tyndall effect in transmitted light. Its Ford cup viscosity (4 mm nozzle) is 20 seconds at a solids content of 29.8%. The pH is 7.1. Films obtained from this dispersion are transparent and hard and suitable for dressing leather.

EXAMPLE 3

Reaction mixture 350.0 g of a polyester of phthalic acid, adipic acid and ethylene glycol (hydroxyl number 64.1) (PE)
87.4 g of propoxylated adduct of 2-butenediol-(1,4) and sodium bisulphite (m.wt 427, 66% in toluene) (AD)
9.0 g of butane-1,4-diol
102.3 g of hexamethylene-1,6-diisocyanate (H)
52.2 g of N-phenyl-diaminopropane-(1,3) (NPDA)
1250.0 g of deionized water
69,1 g of isophorone diisocyanate (IPDI)

Method

The polyester (PE) and adduct (AD) are dehydrated in a water jet vacuum at 110° C. with stirring. The mixture is then cooled to 80° C. and butanediol is stirred in. After 10 minutes stirring, the diisocyanate (H) is added and the mixture is stirred at 80° C. until an isocyanate value of 2.8% reached (approximately 2 hours). The NPDA is then added at 60° C. and the mixture is stirred up at 60° C. until the melt is free from isocyanate (approximately 30 minutes). The solid substance dissolves readily in water at 60° C. to form a finely divided dispersion which has a Ford cup viscosity (4 mm nozzle) of 12 seconds at a solids content of 30.4%. The average molecular weight of the solid substance is 3280. The substance contains 23.6 milliequivalents of $SO_3^\ominus$ groups per 100 g (1.89%).

The oligourethane dispersion which contains amino end groups is stirred up with 38.6 g of IPDI at room temperature for 2 hours. A further 30.5 g of IPDI are then added in order to envelop the dispersion particles with urea according to German Patent Application P 27 08 442 which corresponds to U.S. patent application Ser. No. 875,958 filed Feb. 8, 1978. The dispersion is finally heated at 80° C. for 1 hour.

The Ford cup viscosity (4 mm nozzle) of the dispersion is 12.7 seconds at a solids content of 32.5%. The dispersion does not separate when centrifuged (15 minutes at 3,600 revs. per min. without sedimentation) and shows a Tyndall effect in transmitted light. The pH is 5.4.

Films obtained from this dispersion are clear and transparent. They are not tacky, but have a pleasant, dry handle. The dispersion is suitable for coating textiles.

The tensile strength of the film is 23.1 MPa at an elongation at break of 916%.

EXAMPLE 4

Reaction Mixture 350.0 g of a polyester of phthalic acid, adipic acid and ethylene glycol (hydroxyl number 64.1) (PE)
87.4 g of a propoxylated adduct of 2-butenediol-(1,4) and sodium bisulphite (m.wt. 427, 66% in toluene) (AD)
9.0 g of butane-1,4-diol
102.3 g of hexamethylene-1,6-diisocyanate
58.5 g of o-aniline-aminoethyl-thioether
1250.0 g of deionized water

Method

A finely divided dispersion with amino end groups is obtained according to the method described in Example 1. It shows a Tyndall effect in transmitted light. The Ford cup viscosity (4 mm nozzle) is 38 seconds at a solid content of 30%. The average molecular weight of the solid is 3320. The solid contains 23.4 milliequivalents of $SO_3^\ominus$ groups per 100 g (1.87%).

EXAMPLE 4a 9.6 g of an 80:20 mixture of 2,4- and 2,6-diisocyanato toluenes are introduced into 607 g of the above 30% dispersion and stirred for 10 minutes. For further isocyanate modification similar to that of German Patent Application P 27 08 442 which corresponds to U.S. patent application Ser. No. 875,958, filed Feb. 8, 1978, a further 9.6 g of the above mentioned isocyanate mixture are added at 25° C. and the mixture is stirred until no more isocyanate is detected. At the end of this reaction (after about 3 hours) the temperature is raised to 90° C.

A dispersion which is resistant to sedimentation and shows a Tyndall effect in transmitted light is obtained. At a solids content of 32.8%, the dispersion has a Ford cup viscosity (4 mm nozzle) of 12.7 seconds. It has a pH of 4.5. The film from this dispersion is very hard and non-tacky.

EXAMPLE 4b 18.4 g of a bis-epoxide (started on bisphenol A, m.wt. 338) dissolved in 50 g of acetone are added to 601 g of the dispersion from Example 4 at room temperature. The reaction mixture is then heated to 80° C. and stirred at this temperature for 4 hours. The small quantity of acetone in the reaction mixture is drawn off in a water jet vacuum. A dispersion which is resistant to centrifuging (15 minutes at 3,500 revs. per min.) and has a Ford cup outflow time (4 mm nozzle) of 14.4 seconds at a solids content of 39.5% is obtained. The pH is 4.5. When the dispersion is applied, it forms a substantially tack-free film which may be used as bonding coat on various materials such as textiles or leather.

EXAMPLE 4c 11.4 g of molten, solvent-free, warm 4,4'-diisocyanatodiphenyl methane are added to 500 g of the dispersion from Example 4 and the mixture is slowly heated to 80° C. with stirring. Stirring is then continued at this temperature for 4 hours. The dispersion is free from isocyanate.

A finely divided dispersion which shows a Tyndall effect in transmitted light is obtained. It has a pH of 7.5, and its Ford cup outflow time (4 mm nozzle) is 35.3 seconds at a solids content of 35.3%.

The film of the dispersion is tack-free and hard.

EXAMPLE 5

Reaction Mixture 350.0 g of a polyester of adipic acid, phthalic acid and ethylene glycol (hydroxyl number 66) (PE)
87.4 g of a propoxylated adduct of 2-butenediol-(1,4) and sodium bisulphite (m.wt. 427, 66% in toluene) (AD)
9.0 g of butane-1,4-diol
102.3 g of hexamethylene-1,6-diisocyanate
17.4 g of hydrazine hydrate in
70.0 g of acetone
1250.0 g of deionized water and
67.4 g of isophorone diisocyanate (IPDI)

Method

The same as in Example 4 but instead of o-anilineaminoethyl thioether, a mixture of hydrazine hydrate and acetone which has previously been stirred with a magnetic stirrer for about 1 hour is used. After 15 minutes, the isocyanate-free melt is dispersed with water. The acetone is then evaporated off in a water jet vacuum at about 30° to 35° C. The oligourethane dispersion containing semicarbazide end groups is reacted with IPDI in two stages. In the first stage, the semicarbazide is reacted with 38.6 g of IPDI at 25° C. and in the second stage, the dispersion is modified with IPDI similarly to German Patent Application P 27 08 442 which corresponds to U.S. patent application Ser. No. 875,958 filed Feb. 8, 1978 by adding the remaining IPDI at 25° C. and stirring at 25°–30° C. for 3 hours. The dispersion is then heated at 80° C.

A finely divided dispersion which shows a Tyndall effect in transmitted light and has a Ford cup viscosity (4 mm nozzle) of 11.5 seconds at a solids content of 31.4% is obtained. The pH is 5.4. The films do not stick and they have a pleasant, dry handle.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of aqueous dispersions or solutions of isocyanate polyaddition products, characterized in that oligourethanes
   (a) which have an average molecular weight of less than about 15,000,
   (b) which contain from about 0-120 milliequivalents of chemically fixed ionic groups per 100 g of solid content and/or from about 0-25% by weight, based on the total weight of the oligourethane, of chemically fixed ethylene oxide units —CH$_2$—CH$_2$—O— within a polyether chain and/or from about 0-30% by weight, based on the total weight of the oligourethane, of external emulsifiers which are not chemically fixed, the total quantity of the above mentioned hydrophilic groups or external emulsifiers being sufficient to ensure the dispersibility or solubility of the oligourethanes in water, and
   (c) which have end groups selected from the group consisting of:
      (i) primary or secondary aminic amino groups prepared from the reaction of primary or secondary diamines in which the pKb values for the two amino groups in an aqueous medium at 25° C. differ from each other by a factor of at least about $10^3$ with an isocyanate terminated prepolymer;
      (ii) oxazolidine end groups which decompose into aminic amino groups upon mixing the oligourethane with water; and
      (iii) semicarbazide end groups prepared by reacting hydrazine, hydrazine hydrate or N-C$_1$-C$_4$-alkyl substituted hydrazines with an isocyanate terminated prepolymer are reacted in the aqueous phase with a hydrophobic chain lengthening agent which is at least difunctional and which undergoes an addition reaction or condensation reaction with the amino or semicarbazide end groups to effect chain lengthening of the oligourethanes.

2. Aqueous dispersion or solutions produced according to claim 1.

3. Films or coatings prepared from the aqueous dispersions or solutions produced by the process of claim 1.

4. A process for the preparation of aqueous dispersions or solutions of isocyanate polyaddition products comprising reacting
   (a) a hydrophilic oligourethane having
      (i) an average molecular weight of less than about 10,000,
      (ii) its hydrophilic properties contributed by dispersing centers selected from the group consisting of chemically incorporated cationic or anionic groups present in said oligourethane in from about 0 to 120 milliequivalents per 100 g of oligourethane, chemically incorporated ethylene oxide units present in said oligourethane in from about 0 to 25% by weight, based on the weight of the oligourethane and external emulsifiers present in about 0 to 30% by weight, based on the weight of the oligourethane, and
      (iii) a statistical average of from about 1.8 to 2.2 end groups, said end groups selected from the group consisting of:
         (A) primary or secondary aminic amino groups prepared from the reaction of primary or secondary diamines in which the pKb values for the two amino groups in an aqueous medium at 25° C. differ from each other by a factor of at least about $10^3$ with an isocyanate terminated prepolymer;

(B) oxazolidine end groups which decompose into aminic amino groups upon mixing the oligourethane with water; and (C) semicarbazide end groups with at least one NH end group prepared by reacting hydrazine, hydrazine hydrate or N-$C_1$-$C_4$-alkyl substituted hydrazines with an isocyanate terminated prepolymer, with (b) water containing a hydrophobic at least difunctional chain lengthening agent which reacts with the primary or secondary amino end groups or semicarbazide end groups in an addition reaction or condensation reaction to effect chain lengthening of the oligourethane.

5. The process of claim 4 wherein the hydrophilic oligourethane has
   (i) an average molecular weight of from about 1,000 to 10,000,
   (ii) its hydrophilic properties contributed by dispersing centers selected from the group consisting of chemically incorporated cationic or anionic groups present in said oligourethane in from about 0.5 to 50 milliequivalents per 100 g of oligourethane, chemically incorporated ethylene oxide units present in said oligourethane in from about 3 to 18% by weight, based on the weight of the oligourethane, and external emulsifiers present in about 5 to 20% by weight, based on the weight of the oligourethane, and
   (iii) a statistical average of about 2 end groups.

6. The process of claim 4 wherein the end groups of the hydrophilic oligourethane are primary or secondary aminic amino end groups.

7. The process of claim 4 wherein the end groups of the hydrophilic oligourethane are semicarbazide end groups.

8. The process of claim 4 wherein the end groups of the hydrophilic oligourethane are aminic amino end groups which are contributed by oxazolidine end groups upon mixing the hydrophilic oligourethane with water.

9. The process of claim 4 wherein the proportion by weight of the hydrophilic oligourethane to water is from about 65:35 to 5:95.

10. The process of claim 4 wherein the hydrophobic at least difunctional chain lengthening agent is selected from the group consisting of hydrophobic bis-epoxides having molecular weights of up to about 3,000 and hydrophobic diisocyanates.

11. The process of claim 10 wherein the hydrophobic at least difunctional chain lengthening agent is a hydrophobic diisocyanate.

12. The process of claim 4 wherein the hydrophobic at least difunctional chain lengthening agent is present in sufficient quantities to provide from about 0.4 to 1.0 mol of hydrophobic at least difunctional chain lengthening agent per mol of amino end groups or semicarbazide end groups.

13. The process of claim 4 wherein the hydrophilic oligourethane is free of organic solvents.

14. Aqueous dispersions or solutions of isocyanate polyaddition products produced by the process of claim 4.

* * * * *